United States Patent Office 3,389,173
Patented June 18, 1968

3,389,173
PROCESS FOR PREPARING FUMARIC ACID OF GOOD COLOR FROM MALEIC ACID
Joseph L. Russell, Ridgewood, N.J., and Harry Olenberg, Bronx, N.Y., assignors to Halcon International, Inc., a corporation of Delaware
No Drawing. Continuation-in-part of application Ser. No. 300,655, Aug. 7, 1963. This application Mar. 31, 1966, Ser. No. 538,940
10 Claims. (Cl. 260—537)

ABSTRACT OF THE DISCLOSURE

Fumaric acid is prepared by isomerizing a 10–70 weight percent maleic acid solution with a catalyst system containing a bromine-providing compound, an oxidizing agent, and a strong mineral acid.

---

The present application is a continuation-in-part of copending U.S. application, Ser. No. 300,655, filed Aug. 7, 1963, said copending application in turn being a continuation-in-part of U.S. application, Ser. No. 61,384, filed Oct. 10, 1960, now abandoned.

This invention relates to a process for preparing fumaric acid. More particularly, this invention is directed to an improved process for preparing fumaric acid of good color from maleic acid.

Fumaric acid is commercially valuable material which may be obtained by the isomerization of maleic acid at elevated temperatures or in the presence of certain catalytic materials. An especially advantageous method for preparing fumaric acid involves the isomerization of maleic acid employing a soluble catalyst system containing a bromine-providing compound and an oxidizing agent. Such a catalyst system is described in copending U.S. patent application, Ser. No. 305,547, filed Aug. 29, 1963 now Patent No. 3,262,972.

It is an object of this invention to provide an improved process for the preparation of fumaric acid from maleic acid. It is a further object of the invention to provide an improved process for preparing fumaric acid involving treating aqueous maleic acid with a soluble catalyst system containing a bromine-providing compound and an oxidizing agent.

These and other objects of the following invention will be apparent from the following description:

It has now been found that fumaric acid of improved color may be prepared by isomerizing an aqueous maleic acid solution containing from about 10% to about 70% by weight of maleic acid at temperatures below the boiling point of the solution in the presence of a soluble catalyst system containing a bromine-providing compound, an oxidizing agent having an oxidizing strength of at least about 1.23 volts, and a strong mineral acid. As a guide to the relative strength of oxidizing agents, reference is made to "Handbook of Chemistry," by N. A. Lange, 9th edition, Handbook Publishers, Inc., Sandusky, Ohio (1956), pages 1212–1218, showing a strength (volts) of 2.05 for persulfate, 1.77 for hydrogen peroxide, and 1.23 for chlorate.

We have made the surprising discovery that when maleic acid is isomerized to fumaric acid employing as isomerization agents said bromine providing compound and said oxidizing agent, significant improvements in product fumaric acid color are obtained when the isomerization is carried out in the presence of strong mineral acid. The invention is especially applicable to the preparation of fumaric acid having excellent color from dark colored aqueous scrubber liquors which contain varying amounts of maleic acid and which are commercially obtainable from maleic or phthalic anhydride processes. However, the inventive process is also advantageously used in isomerizing aqueous solutions of highly pure maleic acid. The process of the present invention is carried out at temperatures below the boiling point of the aqueous maleic acid solution. The practical upper limit is 110° C. in the case of the most highly concentrated solutions (a 70% aqueous maleic acid solution boils at about 115° C. at atmospheric pressure), and generally the lower limit is about 50° C. It is preferred that the temperature be at least about 10° C. below the boiling point of the solution. Most preferably, the temperatures are in the range of from about 65° C. to about 90° C.

By "bromine-providing compound" is meant any soluble compound which, when in contact with the oxidizing agent, forms a mono or dioxy bromo complex. Examples of the broad classes of these compounds are: inorganic bromides wherein the bromine has a valance of $-1$; bromine; and N-bromoamides, acylbromides and inorganic hydrobromites wherein the bromine has a valence of $+1$.

Specific examples of the soluble inorganic bromine-providing compound include alkali metal bromides, such as, for example, lithium bromide, sodium bromide, potassium bromide and ammonium bromide; alkaline earth metal bromides, such as, for example, magnesium bromide and calcium bromide; alkali and alkaline earth metal hypobromites, such as, for example, sodium hypobromite, potassium hypobromite and calcium hypobromite; nitrosyl bromide; bromine; cadmium ammonium bromide; hydrogen bromide; N-bromoamides having the formula RCONHBr N-bromoimides having the formula $R(CO)_2NBr$, and acyl bromides having the formula RCOBr, wherein R is an alkyl, alkenyl, aryl or aralkyl hydrocarbon radical having up to 18 carbon atoms, and in the case of N-bromoimides is a constituent of an imide-forming dicarboxylic acid. Examples of N - bromoamides are N - bromoacetamide, N - bromopropionamide, N - bromo - n - butyramide, N - bromo - n - valeramide, N - bromo - n - caproamide, and N - bromo - benzamide. Closely analogous to the foregoing amides are the N - bromoimides, such as N - bromosuccinimide and N - bromophthalimide. Examples of acyl bromides are: acetyl bromide, propionyl bromide, N - butyrl bromide, isobutyrl bromide, n - valeryl bromide, isovaleryl bromide, n - caproyl bromide, capryl bromide, stearyl bromide, and benzoyl bromide. The foregoing organic bromine compounds are effective because they readily hydrolyze when introduced into the maleic acid solution. The hydrolysis results in the formation of HBr which, as indicated above, is an effective bromine-providing compound. The bromine providing compound is used in amounts such that it is present in a concentration of from about 0.001 to about 10.0%, desirably from about 0.01% to about 5%, preferably from about 0.1% to about 3.0% bromine (calculated as $NH_4Br$) based on the weight of maleic acid.

The oxidizing agent employed has an oxidizing strength of at least about 1.23 volts, and is present in an amount corresponding to from about 0.003% to about 10.0%, (i.e., on a molar basis of oxidant calculated as ammonium persulfate) desirably from about 0.1% to about 5.0% and preferably from about 0.5% to about 2.7% based on the weight of maleic acid.

The "oxidizing agent" which may be employed includes the soluble inorganic persulfates, hydrogen peroxide, and the soluble organic peroxides and hydroperoxides. The ammonium or alkali or alkaline earth metal persulfates are preferred. Specifically, sodium persulfate, potassium persulfate, lithium persulfate, calcium persulfate, and manganese persulfate are the most important examples. The organic peroxides include benzoyl peroxide, cyclohexanone peroxide, acetyl peroxide, lauroyl peroxide, t-butylperoxide, and methylcyclohexane peroxide. The hydroperoxides include cumene hydroperoxide, t-butyl hydroperoxide, tetrahydronaphthalene hydroperoxide, and methyl ethyl ketone hydroperoxide.

Suitable mineral acids include sulfuric acid, hydrochloric acid, nitric acid, and phosphoric acid. The mineral acids are employed in amounts in the range of from about 0.2% to about 20%, desirably from about 0.5% to about 15% and preferably from about 0.75% to about 12% by weight based on the maleic acid.

In carrying out the invention, the isomerization catalyst materials as well as the strong mineral acid can be added all at once or continuously or incrementally during the isomerization.

The process is carried out by subjecting an aqueous maleic acid solution to treatment with the above indicated materials. The initial maleic acid concentration of said solutions can be in the range of 10 to 70% by weight.

The following examples illustrates the invention:

EXAMPLE 1

A series of three runs was carried out whereby a colored aqueous maleic acid scrubber liquor previously treated with absorptive carbon and containing about 35% by weight maleic acid was treated in order to isomerize the maleic acid to fumaric acid. In each of the runs, 0.45 wt. percent of ammonium bromide and 2.70 wt. percent of ammonium persulfate based on the maleic acid were added to the scrubber liquor. In each case, the reaction mixture was maintained at 75-84° C. for 30 minutes, after which fumaric acid was separated by filtration and washed with water. In each run, the reaction solution was purged with nitrogen, and the isomerization was carried out under a nitrogen atmosphere.

In the run designated as A, no mineral acid was added. In run B, an aqueous phosphoric acid solution was added in three equal icrements at the beginning and during the isomerization. Total phosphoric acid added was 6 wt. percent based on maleic acid. In run C, aqueous hydrochloric acid solution was added. The amount of hydrochloric acid was the molar equivalent of the phosphoric acid added in run B. The following table gives the percent conversion of maleic acid to fumaric acid and the color of the fumaric acid product obtained in each run:

TABLE 1

| Run | Percent conversion | NH₄OH color |
| --- | --- | --- |
| A | 90.0 | 75 |
| B | 89.1 | 40-50 |
| C | 89.6 | 60-75 |

The results clearly demonstrate that significant product color improvement is obtained employing the phosphoric and hydrochloric acids, with no substantial sacrifice of conversion.

EXAMPLE 2

A series of three runs was carried out whereby a second colored aqueous maleic acid scrubber liquor previously treated with absorptive carbon and containing about 35% by weight maleic acid was treated in order to isomerize the maleic acid to fumaric acid. The reaction conditions and isomerization catalyst and amounts were as described in Example 1.

In the run designated as D, no mineral acid was added. In run E, an aqueous nitric acid solution was added in three portions at the beginning and after 10 and 20 minutes reaction. The total nitric acid added was 4% based on maleic acid. In run F, aqueous sulfuric acid was added similarly in three portions. Total sulfuric acid added was 6% based on maleic acid. The following table gives the percent conversion of maleic acid to fumaric acid and the color of the fumaric acid product obtained in each run.

TABLE 2

| Run | Reaction Temp., ° C. | Percent conversion | NH₄OH color |
| --- | --- | --- | --- |
| D | 70.0-80.8 | 93.5 | 100-125 |
| E | 74.5-87.5 | 91 | 35 |
| F | 76.8-90.5 | 92.2 | 60 |

The results demonstrate the product color improvement obtained through the present invention.

The NH₄OH color referred to in the examples is the color of a solution made by dissolving 10 grams of the subject fumaric acid in 25 cc. of H₂O and 30 cc. of concentrated NH₄OH, the color of said solution being measured on the APHA color scale.

What is claimed is:

1. A process for making fumaric acid which comprises contacting an aqueous solution containing from about 10% to about 70% by weight maleic acid with a soluble catalyst system containing:
    (1) from about 0.001% to about 10% by weight, based on maleic acid, of a soluble bromine-providing compound selected from the group consisting of inorganic bromides, alkali and alkaline earth metal hypobromites, bromine, nitrosyl bromide, hydrogen bromide, N-bromoamides having the formula RCONHBr wherein R is an alkyl group having up to 18 carbon atoms or a phenyl group, N-bromoimides having the formula R(CO)₂NBR wherein R is an alkyl group having up to 18 carbon atoms or a phenyl group, or acyl bromides having the formula RCOBr, wherein R is an alkyl radical having up to 18 carbon atoms.
    (2) from about 0.003% to about 10.0% by weight, based on maleic acid, of a soluble oxidizing agent having an oxidizing strength of at least about 1.23 volts selected from the group consisting of ammonium, alkali or alkaline earth metal persulfates, hydrogen peroxide, and organic peroxides and hydroperoxides having up to 12 carbon atoms, and
    (3) from about 0.2% to about 20% by weight, based on maleic acid, of a strong mineral acid selected from the group consisting of hydrochloric acid, nitric acid, sulfuric acid, or phosphoric acid, said contacting taking place below the boiling point of said aqueous solution at temperatures in the range of from 50° C. to 110° C., thereby precipitating fumaric acid from said solution.

2. A process according to claim 1 wherein the contacting takes place at temperatures at least about 10 C. below the boiling point of the solution.

3. A process according to claim 2 wherein the contacting takes place at temperatures in the range of from about 65° C. to about 90° C.

4. A process according to claim 2 wherein the bromine-providing compound is present in an amount of from about 0.01% to about 5.0% by weight based on maleic acid.

5. A process according to claim 2 wherein the oxidizing agent is present in an amount of from about 0.1% to about 5.0% by weight, based on maleic acid.

6. A process according to claim 3 wherein the bromine-providing compound is present in an amount of from about 0.1% to about 3.0% by weight, based on maleic acid, and the oxidizing agent is present in an amount of from about 0.5% to about 2.7% by weight, based on maleic acid.

7. A process according to claim 4 wherein the mineral acid is present in an amount of from about 0.5% to about 15% by weight, based on maleic acid.

8. A process according to claim 5 wherein the mineral acid is present in an amount of from about 0.5% to about 15% by weight, based on maleic acid.

9. A process according to claim 6 wherein the mineral acid is present in an amount of from about 0.75% to about 12% by weight, based on maleic acid.

10. A process according to claim 9 wherein the bromine-providing compound is ammonium bromide and oxidizing agent is ammonium persulfate.

References Cited

UNITED STATES PATENTS 3,262,972  7/1966  Barker ............. 260—537

FOREIGN PATENTS 775,912  5/1957  Great Britain.

OTHER REFERENCES

Kharasch et al., J. Am. Chem. Soc., vol. 59 (1937) page 1155.

Wachholtz, Chemical Abstracts, vol. 22 (1928) page 908.

LORRAINE A. WEINBERGER, *Primary Examiner.*

V. GARNER, *Assistant Examiner.*